No. 779,474. PATENTED JAN. 10, 1905.
J. H. GRUNER.
MACHINE FOR CUTTING THE SHELLS OF NUTS.
APPLICATION FILED NOV. 21, 1902.

10 SHEETS—SHEET 1.

WITNESSES:
W. W. Canby
R. H. Gamble.

INVENTOR
John H. Gruner
BY
A. V. Groupy
ATTORNEY.

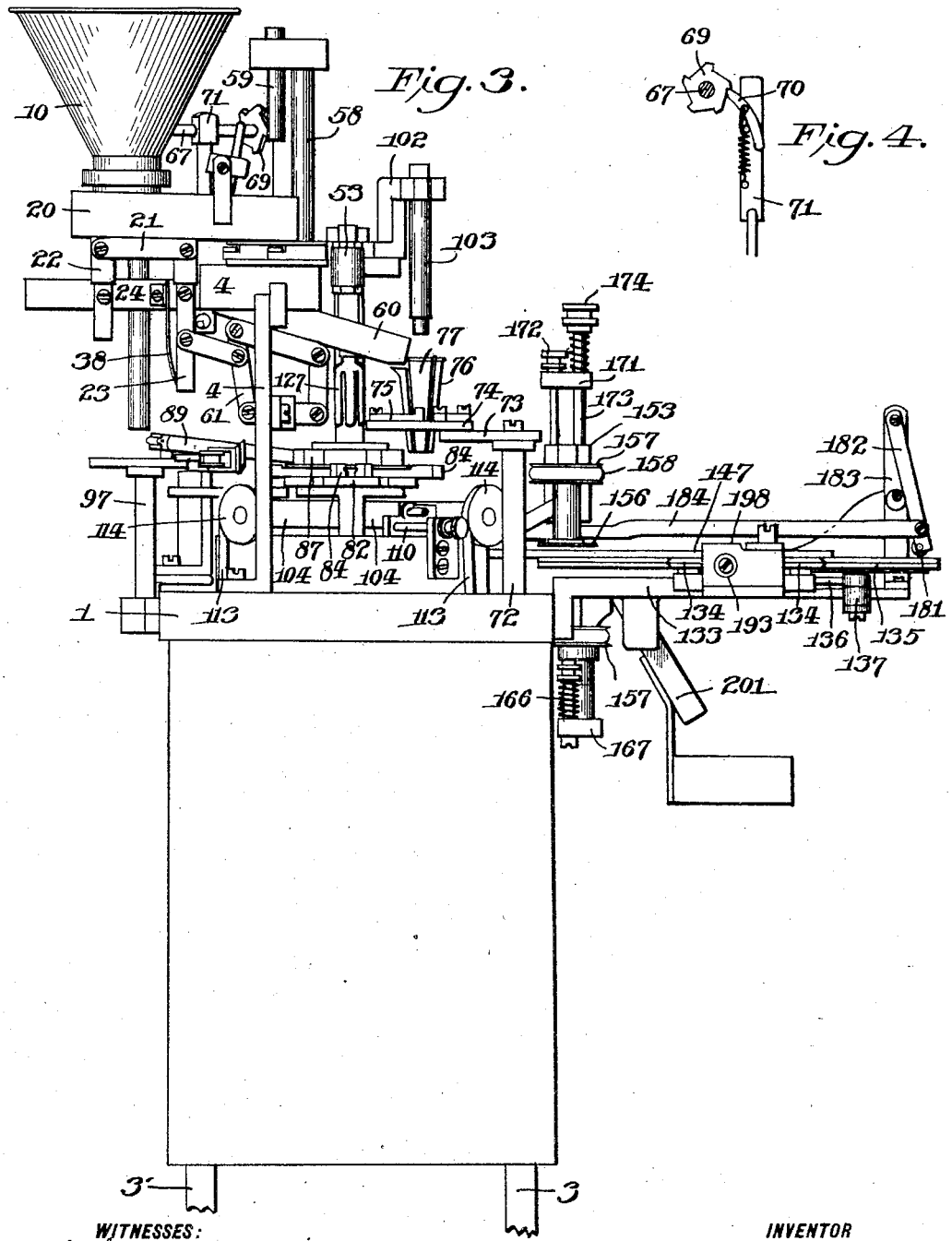

No. 779,474. PATENTED JAN. 10, 1905.
J. H. GRUNER.
MACHINE FOR CUTTING THE SHELLS OF NUTS.
APPLICATION FILED NOV. 21, 1902.
10 SHEETS—SHEET 4.

No. 779,474. PATENTED JAN. 10, 1905.
J. H. GRUNER.
MACHINE FOR CUTTING THE SHELLS OF NUTS.
APPLICATION FILED NOV. 21, 1902.

10 SHEETS—SHEET 5.

WITNESSES:
H. W. Canby
R. H. Gamble

INVENTOR
John H. Gruner
BY A. V. Groupe
ATTORNEY.

No. 779,474. PATENTED JAN. 10, 1905.
J. H. GRUNER.
MACHINE FOR CUTTING THE SHELLS OF NUTS.
APPLICATION FILED NOV. 21, 1902.
10 SHEETS—SHEET 6.
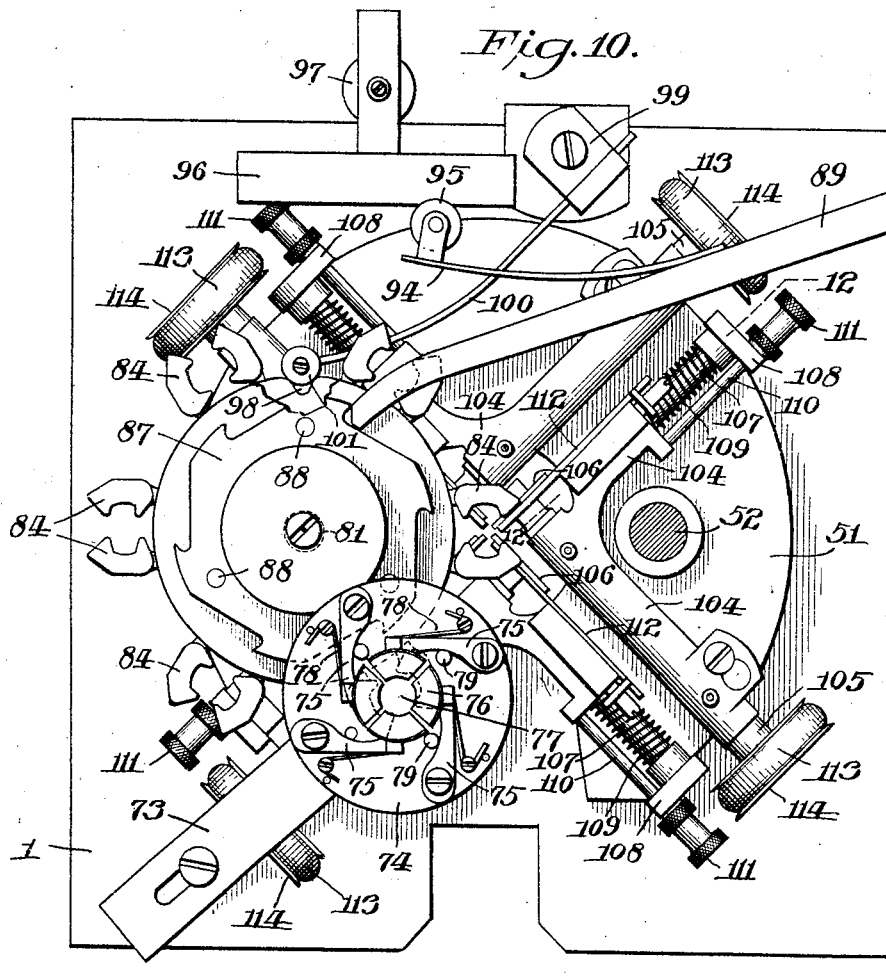
Fig. 10.
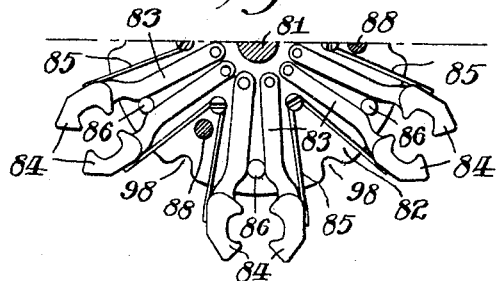
Fig. 11.
Fig. 12.
WITNESSES: INVENTOR
John H. Gruner
BY
ATTORNEY.

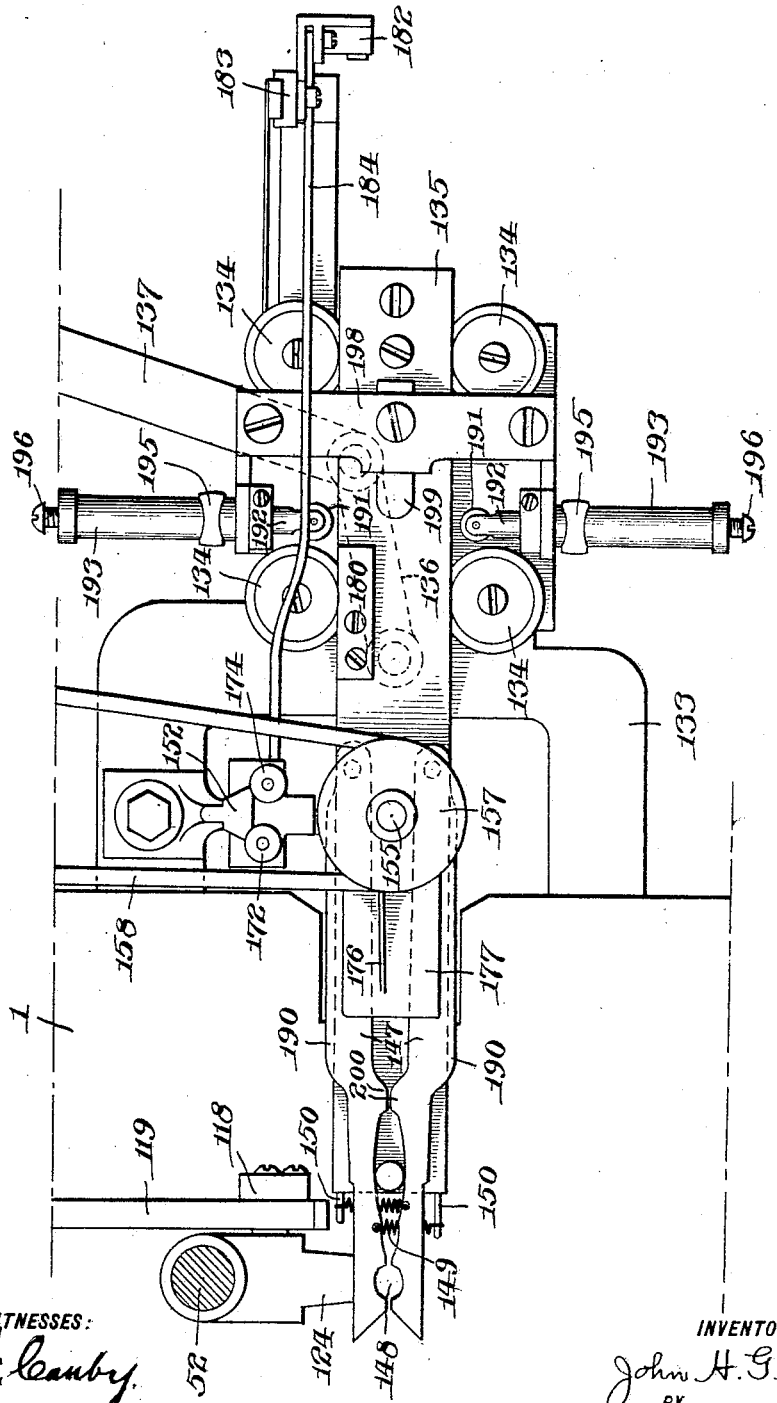
No. 779,474. PATENTED JAN. 10, 1905.
J. H. GRUNER.
MACHINE FOR CUTTING THE SHELLS OF NUTS.
APPLICATION FILED NOV. 21, 1902.
10 SHEETS—SHEET 7.

No. 779,474. PATENTED JAN. 10, 1905.
J. H. GRUNER.
MACHINE FOR CUTTING THE SHELLS OF NUTS.
APPLICATION FILED NOV. 21, 1902.
10 SHEETS—SHEET 8.
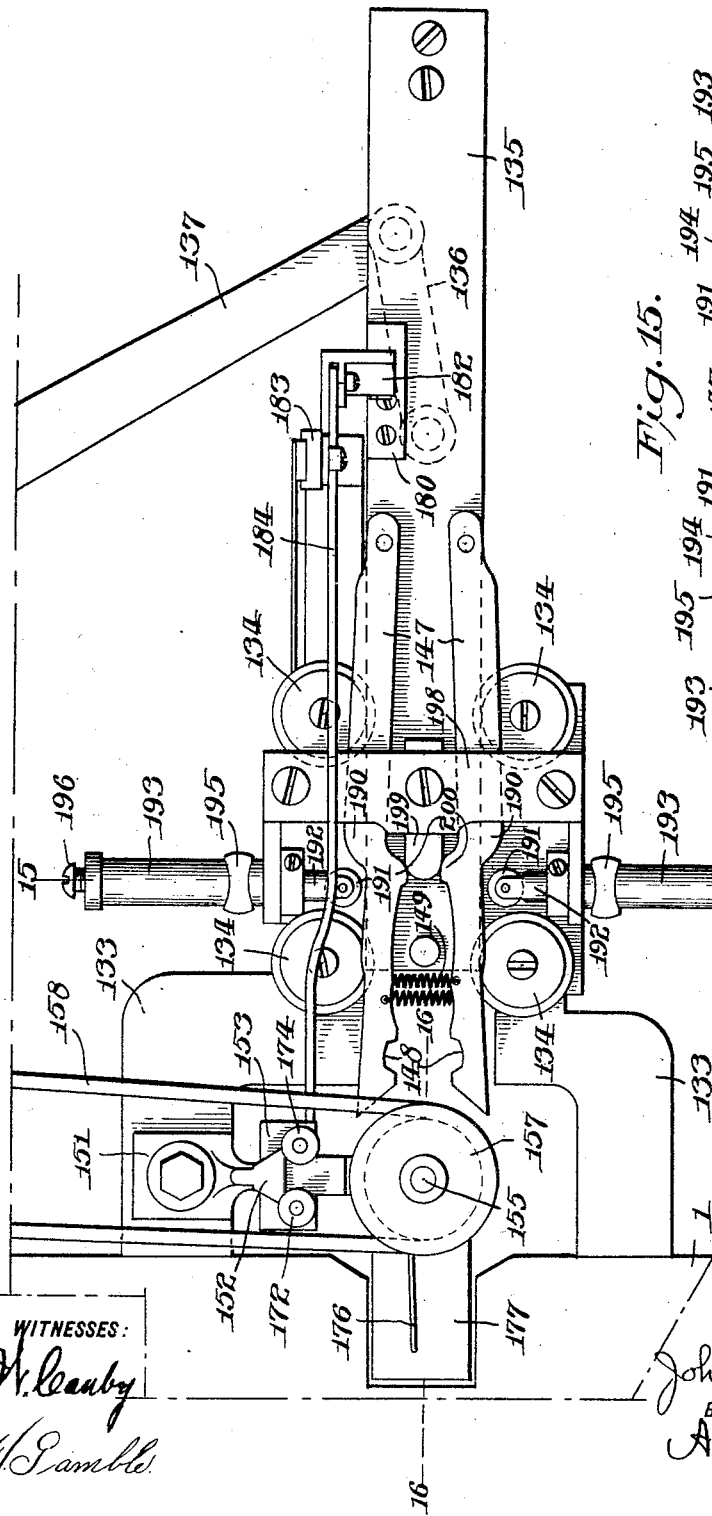
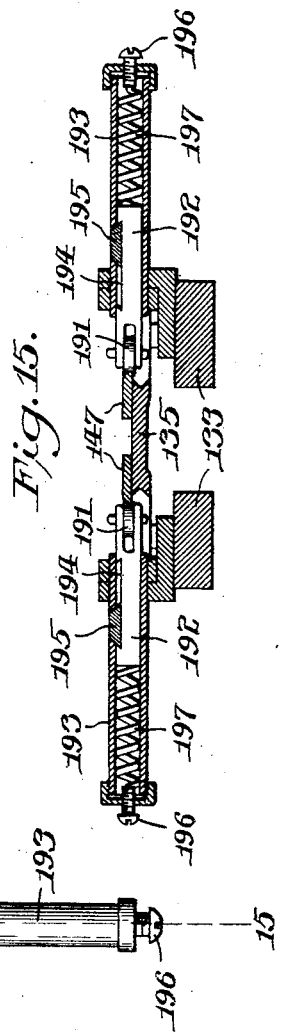
WITNESSES:
W. W. Canby
R. H. Gamble
INVENTOR
John H. Gruner
BY
A. V. Groupe
ATTORNEY.

No. 779,474. PATENTED JAN. 10, 1905.
J. H. GRUNER.
MACHINE FOR CUTTING THE SHELLS OF NUTS.
APPLICATION FILED NOV. 21, 1902.
10 SHEETS—SHEET 9.
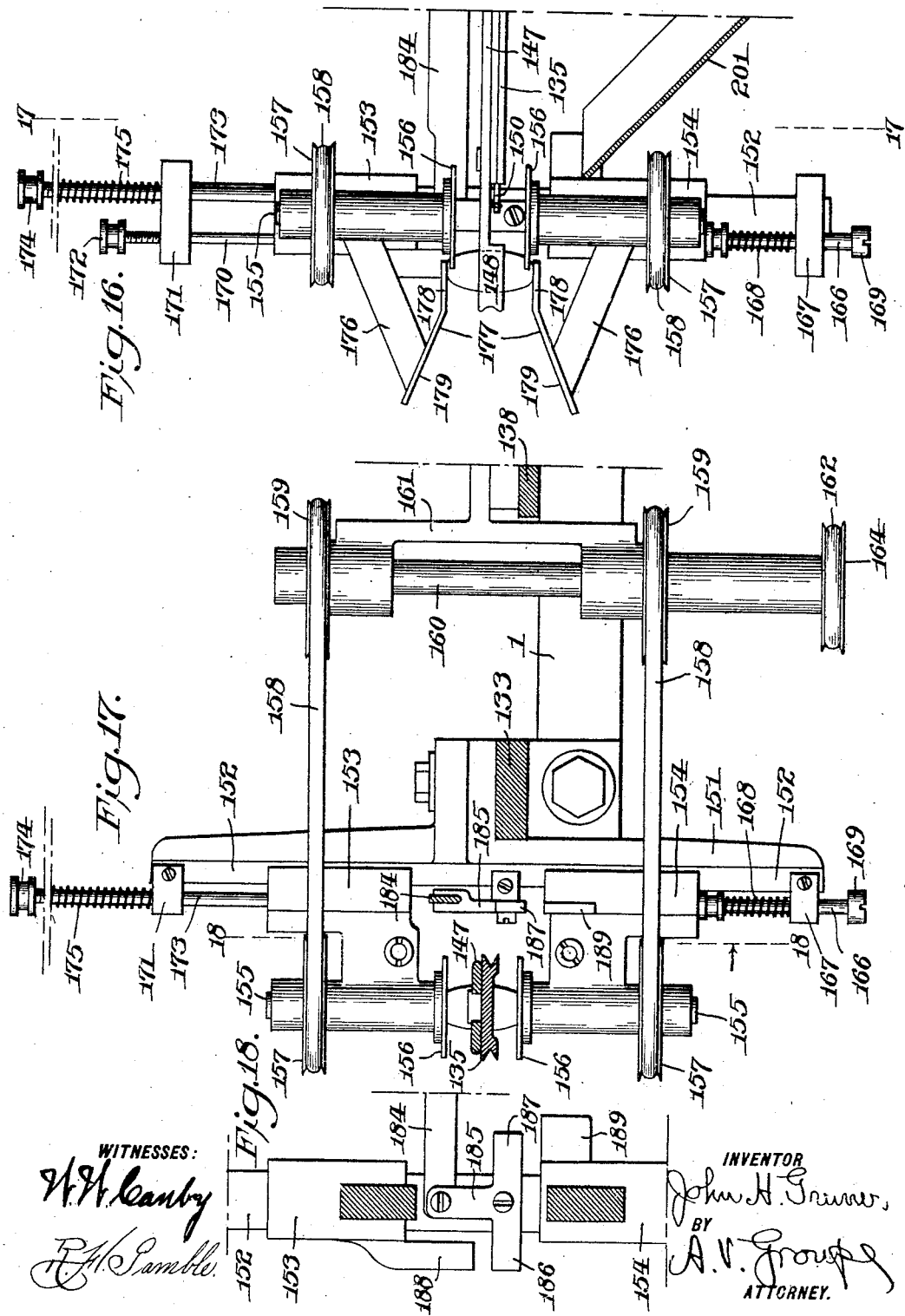

No. 779,474. PATENTED JAN. 10, 1905.
J. H. GRUNER.
MACHINE FOR CUTTING THE SHELLS OF NUTS.
APPLICATION FILED NOV. 21, 1902.

10 SHEETS—SHEET 10.

WITNESSES:
INVENTOR
John H. Gruner
BY
ATTORNEY.

No. 779,474.                                         Patented January 10, 1905.

UNITED STATES PATENT OFFICE.

JOHN H. GRUNER, OF PHILADELPHIA, PENNSYLVANIA.

MACHINE FOR CUTTING THE SHELLS OF NUTS.

SPECIFICATION forming part of Letters Patent No. 779,474, dated January 10, 1905.

Application filed November 21, 1902. Serial No. 132,197.

*To all whom it may concern:*

Be it known that I, JOHN H. GRUNER, a citizen of the United States, residing at Philadelphia, in the county of Philadelphia and State of Pennsylvania, have invented certain new and useful Improvements in Machines for Cutting the Shells of Nuts, of which the following is a specification.

This invention relates to machines for cutting shells of nuts, and has for its object to provide a simple and efficient construction of mechanism whereby a series of slits may be cut through the shells of nuts and whereby a portion of the shell may be severed from each nut, so that the shells may be easily separated from the kernels by hand or other means.

With this object in view the invention consists in the novel construction and combinations of parts, which will be hereinafter fully described and claimed.

Figure 1:
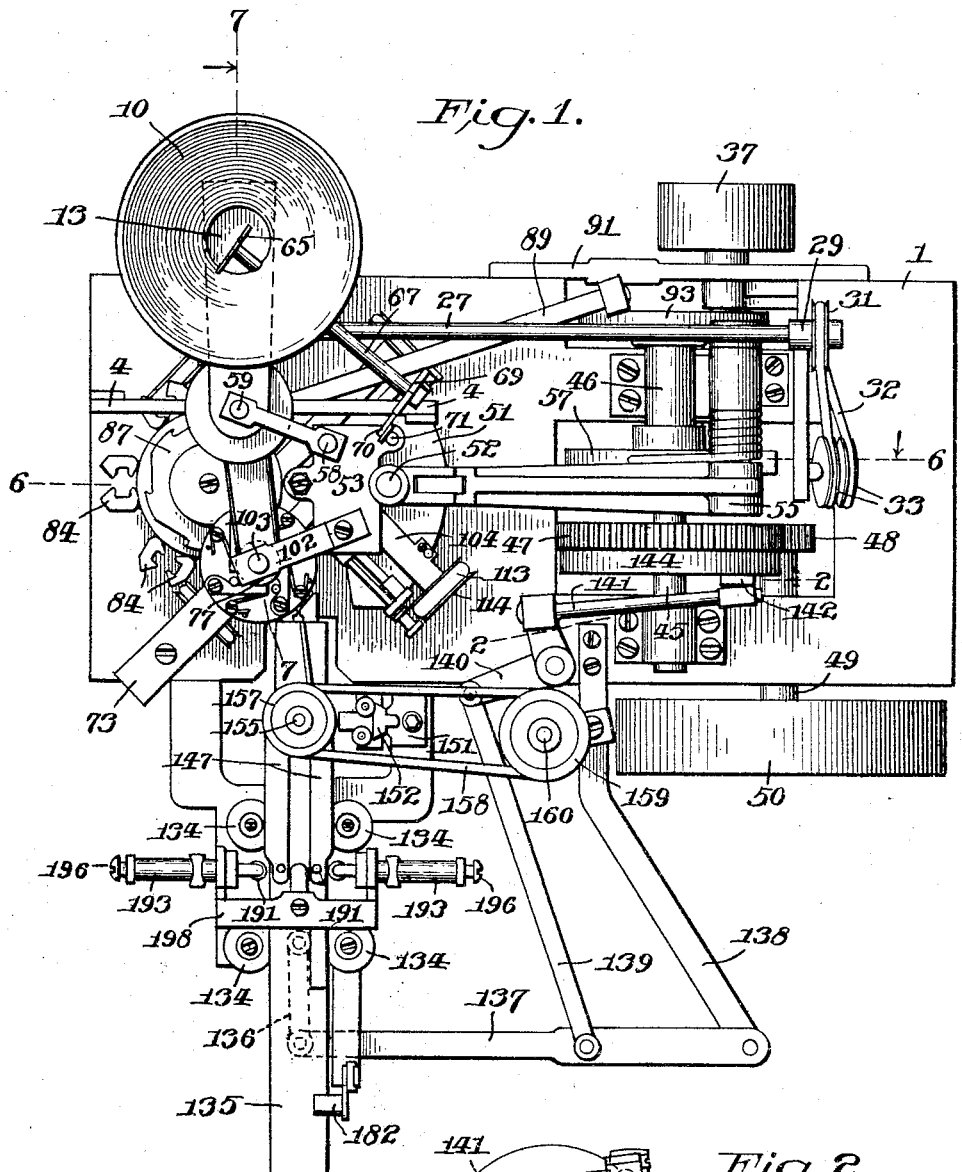
Figure 2:
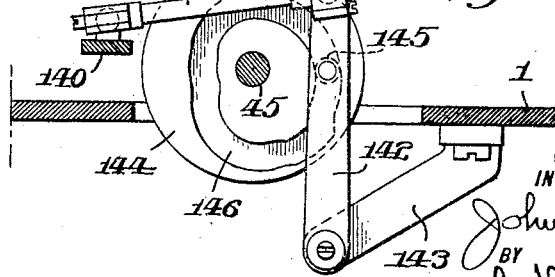
Figure 5:
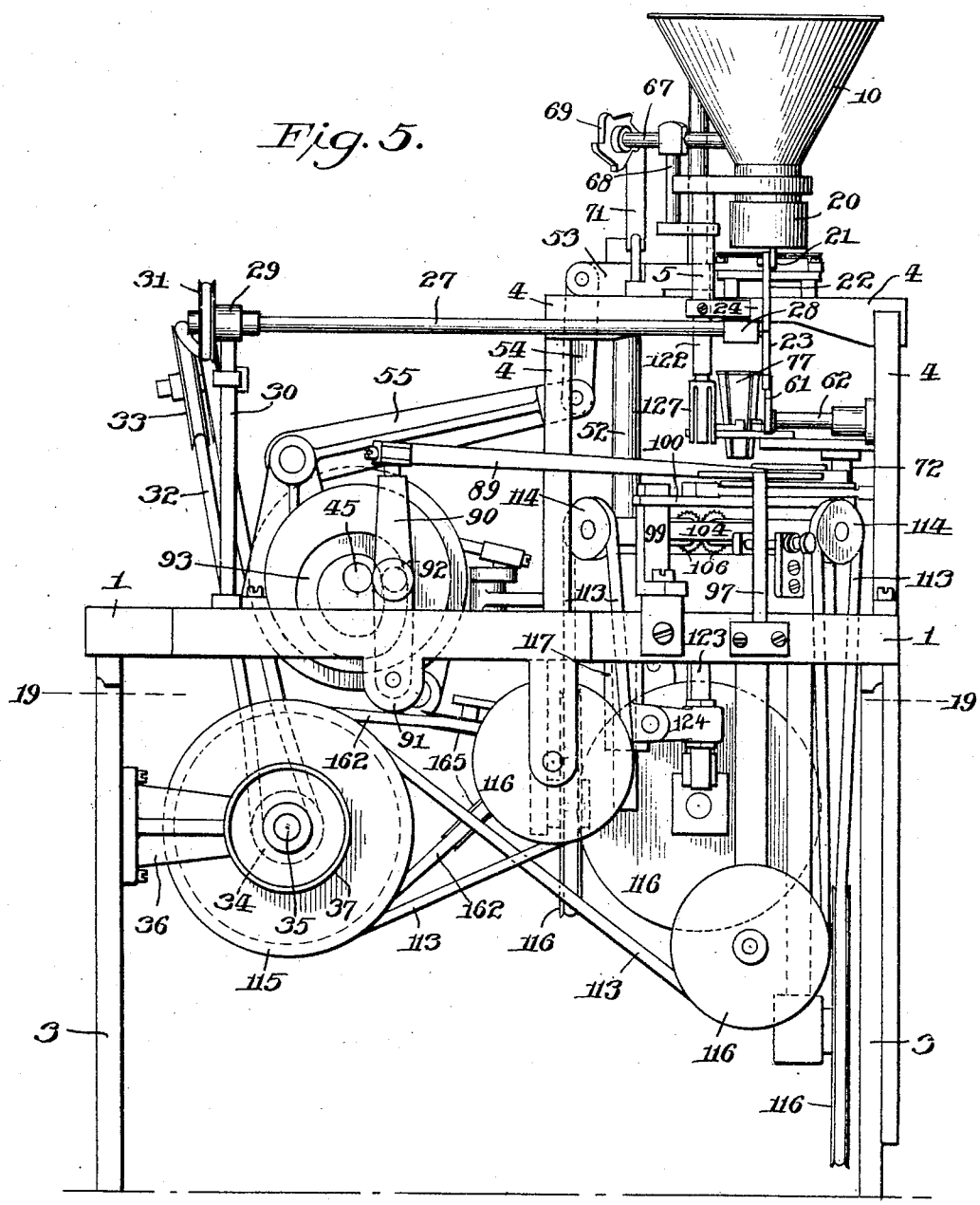
Figure 6:
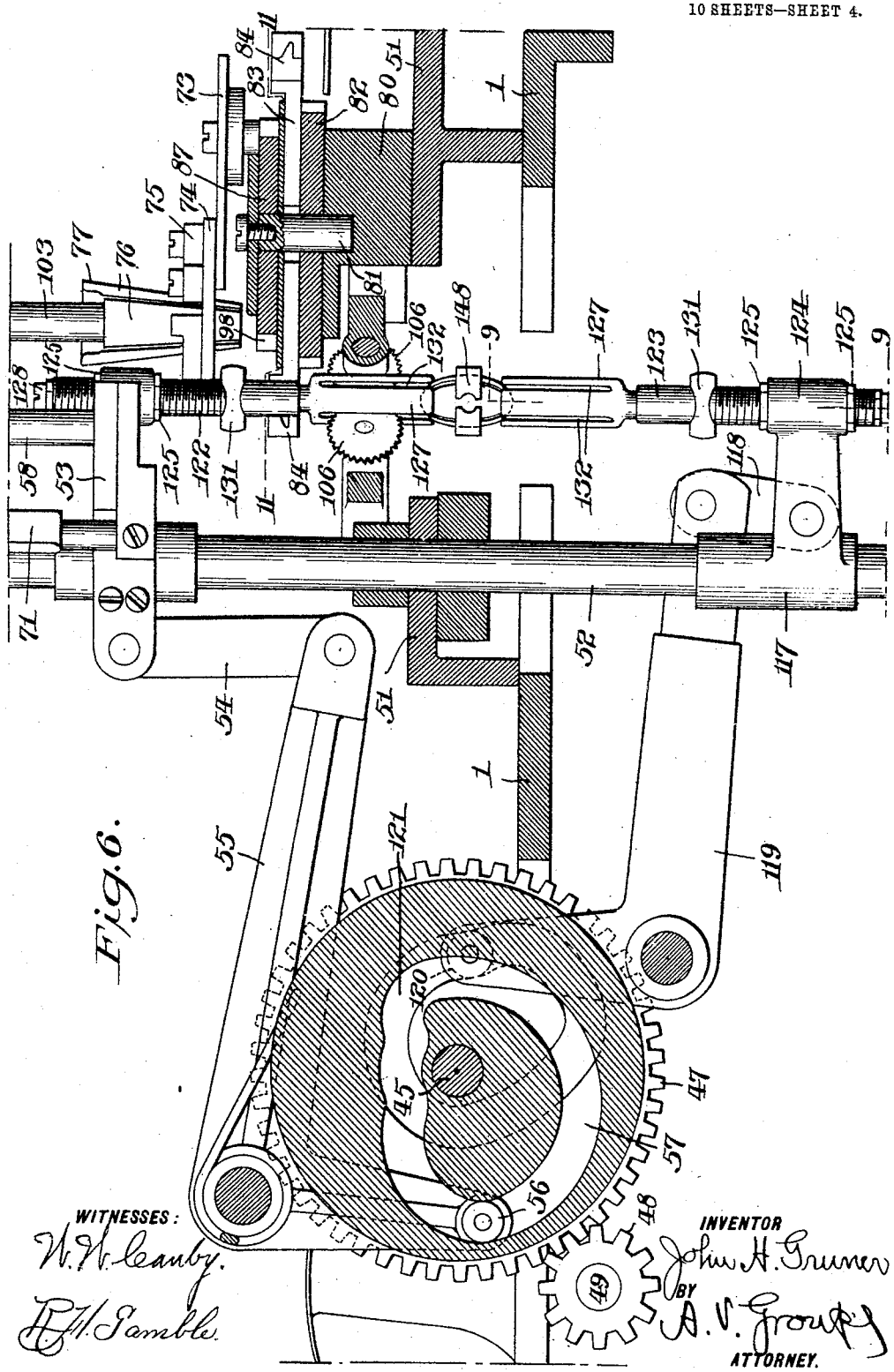
Figure 7:
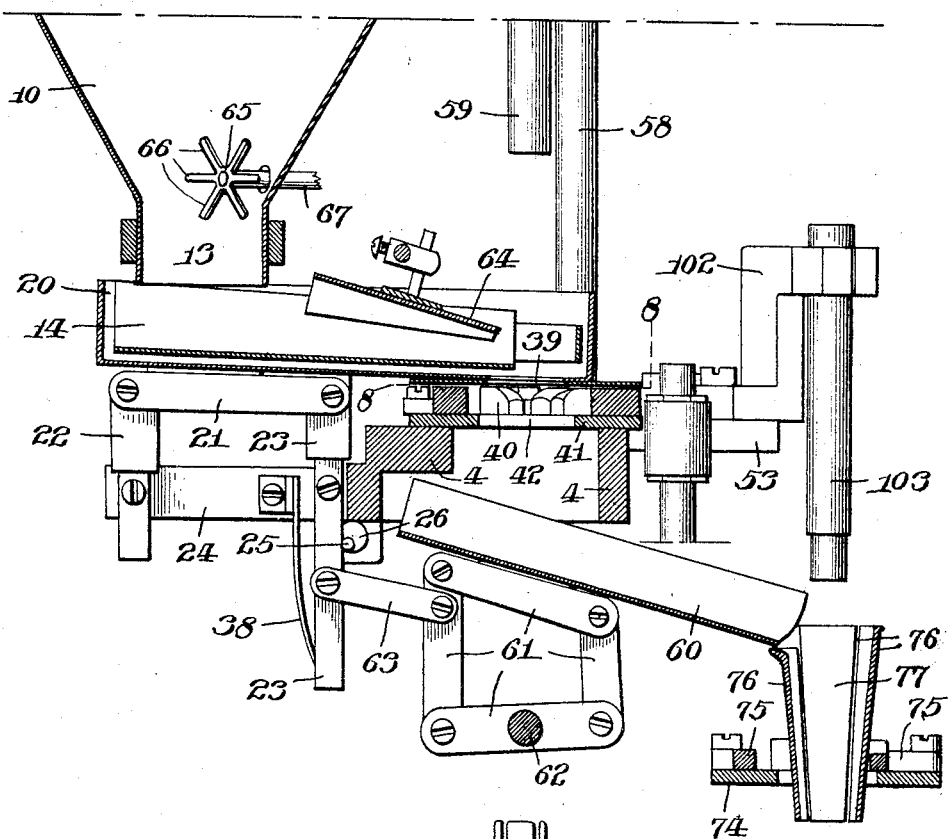
Figure 8:
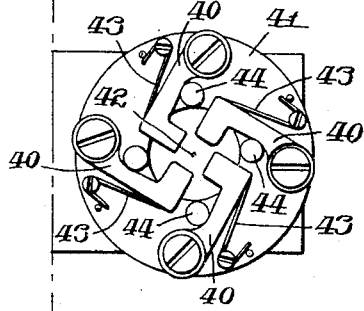
Figure 9:
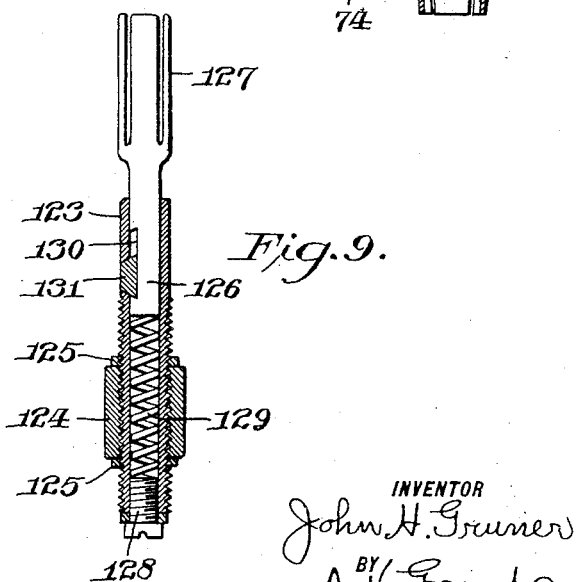
Figure 19:
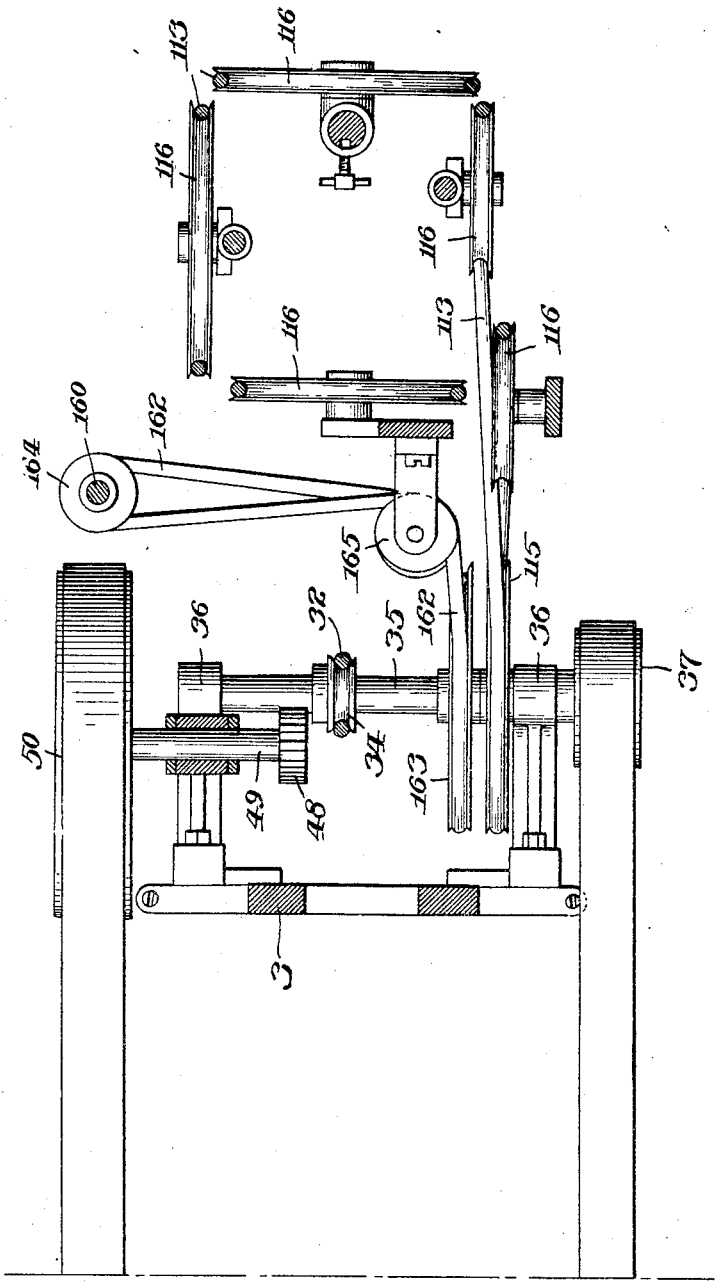

In the drawings, Figure 1 is a plan view of the improved machine. Fig. 2 is a sectional detail as on the line 2 2 of Fig. 1. Fig. 3 is a front elevation of the machine. Fig. 4 is a detail hereinafter referred to. Fig. 5 is a side elevation of the machine. Fig. 6 is a vertical section as on the line 6 6 of Fig. 1. Fig. 7 is a vertical section as on the line 7 7 of Fig. 1. Fig. 8 is a plan view below the line 8 8 of Fig. 7. Fig. 9 is a sectional detail as on the line 9 9 of Fig. 6. Fig. 10 is a plan view of a part of the cutting mechanism and adjuncts. Fig. 11 is a sectional plan as on the line 11 11 of Fig. 6. Fig. 12 is a sectional detail as on the line 12 12 of Fig. 10. Fig. 13 is a plan view of the reciprocating clamping-arms in the forward position. Fig. 14 is a similar view in the rearward position. Fig. 15 is a transverse section as on the line 15 15 of Fig. 14. Fig. 16 is a vertical section as on the line 16 16 of Fig. 14. Fig. 17 is a similar section as on the line 17 17 of Fig. 16. Fig. 18 is a sectional detail as on the line 18 18 of Fig. 17. Fig. 19 is a sectional plan of the driving mechanism below the line 19 19 of Fig. 5.

The main frame of the machine comprises the bed-plate 1, the supporting-legs 3, and the housing 4.

Mounted on a bracket 5, projecting upwardly from the housing, is a hopper 10, preferably funnel-shaped, provided with an opening 13 in its bottom. Beneath this opening is arranged the upper end of a slightly-inclined trough 14, adapted to receive nuts from the hopper.

The trough 14 is supported within a casing 20, which is mounted on a link 21, connecting the upper ends of a pair of arms 22 23. These arms are pivoted to a projection 24 on the housing, and the arm 23 projects downwardly and is arranged adjacent to a pin 25, which is carried by a disk 26 on the end of a shaft 27. This shaft is journaled in bearings 28 29 on the housing 4 and a standard 30, respectively, rising from the bed-plate and is provided with a pulley 31, which is driven by a belt 32, passing around idlers 33 and a pulley 34 on a shaft 35, which is journaled in bearings 36 on the main frame. The shaft 35 is provided with a pulley 37, by means of which it may be driven from any suitable source of power.

The lower portion of the arm 23 is held against the pin 25 by the action of a spring 38, secured to the projection 24, so that as the shaft 27 is rotated the arm 23, the link 21, and perforce the trough 14, is agitated to cause the passage of the nuts through the latter.

After the nuts leave the trough 14 they extend through an opening 39 in the casing 20 and rest upon the inner ends of a series of pivoted arms 40, which are arranged on a plate 41, supported by the housing. The inner ends of the arms 40 extend over an opening 42 in the plate 41 and are held normally inward by the action of springs 43, suitable stop-pins 44 being provided to limit the inward movement of the arms.

The main driving-shaft 45 is journaled in bearings 46 on the bed-plate and is provided with a gear-wheel 47, which meshes with a gear-wheel 48 on a shaft 49. One end of the shaft 49 projects outwardly and is provided with a pulley 50, by means of which the shaft may be driven from any suitable source of power.

The bed-plate 1 is provided with a raised plate 51, which supports a fixed vertical shaft 52, extending above and below the bed-plate. The upper end of this shaft has slidingly fitted thereto a head 53, which is connected by a link 54 to a bell-crank lever 55. This lever is mounted on a bracket on the bed-plate and is provided with an antifriction-roller 56, which is engaged by a cam 57, fixed to the shaft 45, whereby during the rotation of the latter the head 53 is vertically reciprocated.

Rising from the head 53 is a post 58, the upper end of which supports a depending plunger 59, which is arranged directly above the openings 39 and 42 and the arms 40. During each reciprocative stroke of the head 53 the plunger 59 forces the nut resting on the arms 40 past the latter and through the opening 42, the arms 40 moving outward to permit the descent of the nut. The nut drops from the arms 40 into an inclined chute 60, which is mounted on a frame 61, composed of four links pivoted at their respective ends. This frame 61 is pivotally mounted on a stud 62, projecting from the housing 4, and is connected by a link 63 to the lower portion of the arm 23, whereby when the latter is operated by the pin 25 the frame 61, and perforce the chute 60, is agitated similarly to the trough 14.

The plate 64, supported above the trough 14, insures the passage of the nuts through the latter in succession, and as each nut rests upon the arms 40 it projects a sufficient distance above the bottom of the trough 14 to prevent the succeeding nut leaving said trough and entering the path of the plunger 59 until the latter has cleared the arms 40 of the nut resting thereon.

In order to prevent the nuts from jamming in the bottom of the hopper, I locate within the latter a wheel 65, provided with arms 66, which agitates the nuts. This wheel is mounted on the inner end of a shaft 67, journaled in the upper end of a post 68, projecting from the bracket 5. The outer end of the shaft 67 is provided with a ratchet-wheel 69, which is engaged by a pawl 70, carried by the upper end of a post 71, rising from the head 53, whereby when the head is reciprocated the shaft 67, and perforce the wheel 65, is actuated. (See Fig. 4.)

Rising from the bed-plate 1 is a post 72, provided with a horizontal extension 73, which supports a plate 74. Pivotally mounted on this plate are a series of inwardly-extending arms 75, carrying on their inner ends vertical members 76, which are arranged so as to form a receptacle 77 below the lower end of the chute 60. The arms 75 and members 76 are held normally in the position shown by the action of suitable springs 78, stop-pins 79 being provided to limit the inward movement of said arms. The receptacle 77 extends through a central opening in the plate 74, and the members 76 are made tapering, as shown, so as to temporarily support each of the nuts in vertical position as they are successively received from the chute 60.

Supported by a block 80 on the plate 51 is a stud-shaft 81, on which is rotatably mounted a wheel 82, which carries a series of radially-disposed arms 83. These arms are arranged in pairs and are pivoted at their inner ends to the wheel 82. The outer ends of the arms are provided with jaws 84, whereby each pair of arms is adapted to receive and hold a nut.

The wheel 82 is provided with springs 85, which act against the jaws 84 and tend to force each pair of the latter toward each other, pins 86 limiting the movement of the jaws.

87 is a ratchet-wheel which is mounted on the shaft 81 and secured to the wheel 82 by means of screws 88. Coacting with this ratchet-wheel is a pawl 89, mounted on the upper end of an arm 90, which is pivoted at its lower end to a bracket 91 on the bed-plate. The arm 90 is provided with a roller 92, which is engaged by a cam 93, fixed to the shaft 45, whereby during each revolution of the latter the ratchet-wheel is moved a distance of one tooth. The pawl 89 is provided with a spring 94, by means of which it is kept in engagement with the ratchet, the free end of the spring being provided with an antifriction-roller 95, which bears against a bar 96, supported by a post 97 on the bed-plate.

The teeth of the ratchet-wheel 87 correspond in number with the pairs of jaws 84, so that when the ratchet-wheel, and perforce the wheel 82, is intermittently rotated the pairs of jaws are brought successively to a point directly beneath the lower open end of the receptacle 77.

In order to lock the wheel 82 in position after each successive movement of the latter, I provide said wheel with notches 98 on its periphery which correspond in number with the pairs of jaws and also provide the bed-plate with a bracket 99, from which projects a spring-arm 100, having on its free end a roller 101, which is adapted to engage the notches successively, and thereby prevent the rotation of the wheel during each rearward stroke of the pawl 89.

The head 53 is provided with a bracket 102, which carries a depending plunger 103, arranged in line with and directly above the receptacle 77, whereby during each descent of the head the nut contained in the receptacle is forced through the latter and into the underlying jaws 84, the members 76 moving outwardly against the springs 78 and permitting the descent of the nut irrespective of the size of the latter.

Arranged on the plate 51 are frames 104, in which are journaled shafts 195, which project toward the center of the plate. The inner ends of these shafts are provided with toothed circular cutters 106, which are arranged so as to radiate from a point directly below the center of the first pair of jaws 84 in advance of those located below the receptacle 77. The frames 104 are slidingly fitted to horizontal shafts 107, which are arranged at right angles to the shafts 105 and project inwardly from posts 108, rising from the edge of the plate 51, whereby the cutters 106, and perforce the frames 104, may be moved toward and away from each other in direct radial lines.

Interposed between the frames 104 and the posts 108 are springs 109, which encircle the shafts 107 and tend to force the cutters toward each other, and the frames 104 are provided with outwardly-projecting pins 110, which extend through the posts 108 and are provided with adjustable thumb-nuts 111, adapted to take against the posts, and thereby limit the inward movement of the cutters. The frames 104 are provided with plates 112, each of which extends inwardly to a point near the inner edge of its adjacent cutter 106 for a purpose hereinafter explained.

The shafts 105 are driven by a belt 113, passing around pulleys 114 on the outer ends of said shafts, and the belt 113 is driven by a pulley 115 on the shaft 35, suitable idlers 116 being provided to guide the belt to and from the pulleys 114 and 115.

Slidingly fitted to the shaft 52 below the bed-plate is a collar 117, which is connected by a link 118 to a bell-crank lever 119. This lever is mounted on a bracket on the under side of the bed-plate and is provided with a roller 120, which is engaged by a cam-groove 121, cut in the face of the gear-wheel 47, whereby when the shaft 45 is rotated the collar 117 is reciprocated.

122 and 123 are two oppositely-disposed hollow shafts which are screw-threaded and extend through the head 53 and an extension 124 on the collar 117, respectively. The shafts 122 and 123 are provided with set-nuts 125, which are adapted to take against the head 53 and projection 124, and thereby lock the shafts in place. By manipulating the nuts 125 the shafts 122 123 may be adjusted toward or from each other as occasion may require.

Fitted to the hollow shafts 122 123 are the reduced ends 126 of two oppositely-disposed elongated clamping members 127. Bearing against the ends of the clamping members 127 and screws 128 in the opposite ends of the shafts 122 123 are springs 129, which tend to force the clamping members toward each other. By manipulating the screws 128 the pressure of the springs 129 may be nicely regulated.

The reduced ends 126 of the clamping members 127 are provided with flat offsets 130, which are fitted to plates 131, extending through the shafts 122 123. These plates serve to prevent the rotation of the clamping members 127 and also to limit their movement toward each other.

The clamping members 127 are arranged on a vertical line passing between the inner edges of the cutters 106 and the superposed clamping-jaws 84 and are provided with openings 132 for the admission of the cutters 106. During each revolution of the shaft 45 the pawl 89 actuates the wheel 82 to transfer a nut from the receptacle 77 to a point above the cutters 106. When the nut occupies this position, the clamping members 127, being in the raised position and located above and below the nut, are given a slight movement toward each other by the cams 57 and 121, so as to clamp the nut between said members. This being done, the members 127 descend and carry the nut down between the cutters 106.

The nut during its descent takes against the inner ends of the plates 112 and forces the frames 104 outwardly against the action of the springs 109, and at the same time the inner edges of the cutters 106, projecting slightly beyond the inner ends of the plates 112, cut a series of longitudinal slits through the shell of the nut.

Projecting outwardly from the bed-plate 1 is a bracket 133, provided with rollers 134, having V-shaped peripheries. Arranged between these rollers 134 and fitted thereto are V-shaped grooves in the edges of a longitudinally-reciprocative bar 135, which is connected by a link 136 to an arm 137, pivoted to the outer end of a bracket 138, projecting from the bed-plate. The arm 137 is connected by a link 139 to one arm of a bell-crank lever 140, mounted on the bed-plate. The other arm of this lever 140 is connected by a link 141 to the upper end of an arm 142, which is pivoted at its lower end to a bracket 143 on the under side of the bed-plate. The arm 142 is arranged adjacent to a cam 144 on the shaft 45 and is provided with a roller 145, projecting into a groove 146 in said cam, whereby during the rotation of the shaft 45 the bar 135 is longitudinally reciprocated.

The bar 135 is provided with a pair of pivoted arms 147, the free ends of which have a pair of jaws 148 formed therein and are drawn toward each other by the action of the springs 149, secured at their respective ends to the arms 147 and pins 150, projecting from the end of the bar 135.

The arms 147 are beveled at their free ends, as shown, and are arranged in line with the nut clamped between the clamping members 127 when the latter occupy their lowermost positions. During the forward stroke of the bar 135 the jaws 148 are closed by the action of the springs 149 and the arms 147 occupy the position shown in Fig. 13.

Just prior to the completion of the forward stroke of the bar 135 the beveled ends of the arms 147 act upon the nut in a manner to open the jaws 148, which upon the completion of the stroke embrace and hold the nut by the action of the springs 149. After the nut has been clamped by the jaws 148 the members 127 are given a slight movement away from each other to release the nut by the action of the cams 57 and 121. This being done, the reverse stroke of the bar 135 is effected by the action of the cam 144.

Mounted on the bracket 133 is a vertical bar 151, provided with a dovetail rib 152, to which are fitted the dovetail grooves of two oppositely-disposed sliding frames 153 154, arranged above and below the bar 135, respectively. Rotatably mounted in these frames are two vertical shafts 155, arranged on a line passing between the arms 147 and being provided on their opposing ends with rotary cutters 156.

The shafts 155 are provided with pulleys 157, which are connected by belts 158 with pulleys 159 on a vertical shaft 160, journaled in a bracket 161, supported by the bracket 138.

The shaft 160, and perforce the shafts 155 and cutters 156, are driven by a belt 162, passing around a pulley 163 on the driven shaft 35, and a pulley 164 on the shaft 160, suitable idlers 165 being provided to guide the belt to and from the pulleys 163 and 164.

The lower frame 154 is provided with a depending pin 166, which passes through a block 167, projecting from the lower end of the rib 152. This frame is forced upward by the action of a spring 168, encircling the pin 166, the upward movement of the frame being limited by a head 169 on the lower end of the pin 166 coming in contact with the block 167.

The upper frame 153 is provided with a pin 170, which extends upwardly through a block 171, projecting from the upper end of the rib 152. This upper frame tends to move toward the lower frame by gravity, and its downward movement is limited by a head 172 on the upper end of the pin 170 coming in contact with the block 171.

In order to partly support the upper frame 153, so that the same may be easily raised, I provide a pin 173, which extends upward from said frame through the block 171. This pin is provided with a head 174 and has interposed between the latter and the block 171 a spring 175 of sufficient strength to support a portion of the weight of the upper frame.

The cutters 156 are located on each side of the path traversed by the clamping-jaws 148, and the frames 153 154 are provided with arms 176, to which are affixed a pair of plates 177, having parallel horizontal portions 178 and inclined diverging portions 179, the inner faces of the horizontal portions being located adjacent to and a slight distance beyond the outer faces of the cutters 156.

The nut is clamped between the jaws 148 about midway of its respective ends, and during the rearward stroke of the bar 135 is drawn between the opposing faces of the plates 177. The ends of the nuts acting against the inclined faces 179 of the plates force the frames 153 154 apart until the parallel horizontal portions 178 of the said plates are reached. The frames 153 154 now remain idle until the nut is drawn between the cutters 156. During this latter operation the cutters sever from the respective ends of the nut a thickness of shell corresponding to the space between each cutter 156 and the opposing face of its plate 177. As the frames 153 154 have a tendency toward each other, as above explained, and are held apart by the nut during the cutting operation, the same thickness of shell will be severed from each succeeding nut irrespective of the size of the latter.

Immediately following the severing of the ends from the nut a block 180 on the bar 135 acts against a roller 181 on the lower end of an arm 182. This arm is pivoted at its upper end to a standard 183, rising from the bracket 133, and is connected by a link 184 to the upper end of an arm 185, pivoted to the rib 152 between the frames 153 and 154. The arm 185 is provided with oppositely-disposed horizontal projections 186 187, which are adapted to act against lugs 188 189, projecting from the frames 153 154, respectively, whereby when the block 180 moves the arm 182 outwardly the projections 186 187 on the arm 185 coact with the lugs 188 189 in a manner to move the frames 153 154 apart, and thereby free the nut from the cutters 156.

The springs 149 are made comparatively light to permit the jaws 148 to be easily opened; but during the passage of the nut between the plates 177 and the cutters 156 it is necessary that the same be more firmly clamped between the jaws 148. I therefore provide the arms 147 with expanded portions 190, which are adapted to be acted upon by antifriction-rollers 191 on the inner ends of two oppositely-disposed spring-actuated pins 192. These pins are slidingly fitted to hollow frames 193, secured to the bracket 133, and are provided with flat offsets 194, which are fitted to plates 195, extending through the frames 193. The plates 195 serve to prevent the rotation of the pins 192 and also to limit their movement toward each other. Bearing against the outer ends of the pins 192 and screws 196 in the outer ends of the frames 193 are springs 197, which tend to force the pins 192 toward each other. By adjusting the screws 196 the pressure of the springs may be nicely regulated.

Just before the nut passes between the plates the expanded portions 190 of the arm 147 are drawn between rollers 191 on the opposing ends of the pins 192, which, in addition to the action of the springs 149, firmly clamp the nut between the jaws 148.

Supported above the arms 147 by the bracket 133 is a plate 198, which is provided on its under side with a block 199. The arms 147 are provided on their inner edges with beveled projections 200, which are adapted to act against the rounded end of the block 199, and thereby force the arms 147 apart.

Prior to the completion of the rearward stroke of the bar 135 and after the nut is moved from between the cutters 156 the rollers 191 escape the expanded portions of the arms 147 and the projections 200 coact with the block 199 in a manner to open the jaws 148, thereby releasing the nut, which drops into an inclined chute 201. The nuts may be directed from this chute to any suitable receptacle below.

After the ends have been severed from the nut and the shell thereof provided with the slits, as above described, the entire shell may be easily separated from the kernel by hand.

I claim—

1. In a machine of the character described, the combination of a carrier provided with a plurality of spring-actuated clamping-jaws to receive and hold nuts, the acting surface of said jaws extending in planes parallel to the line of feed of said nuts to such surfaces, means for actuating said carrier, a cutting mechanism, and means for carrying nuts from the jaws and through the cutting mechanism.

2. In a machine of the character described, the combination with nut-feeding mechanism, of a carrier provided with a plurality of spring-actuated clamping-jaws to receive and hold nuts fed thereto by said mechanism, the acting surfaces of said jaws extending in planes parallel to the line of feed of said nuts, means for actuating said carrier, a cutting mechanism and means for carrying nuts from the jaws to and through said cutting mechanism.

3. In a machine of the character described, the combination of a wheel provided with a plurality of spring-actuated clamping-jaws to receive and hold nuts the acting surfaces of said jaws extending in planes parallel to the line of feed of said nuts to such surfaces, means for intermittently rotating said wheel, a cutting mechanism, and means for carrying nuts from the jaws and through the cutting mechanism.

4. In a machine of the character described, the combination with nut-feeding mechanism, of a wheel provided with a plurality of spring-actuated clamping-jaws to receive and hold nuts fed thereto by said mechanism, the acting surface of said jaws extending in planes parallel to the line of feed of said nuts to such surfaces, means for intermittently rotating said wheel, a cutting mechanism, and means for carrying nuts from the jaws and through the cutting mechanism.

5. In a machine of the character described, the combination of a feed-hopper, means to receive nuts from said hopper and advance them in close contact in a single row, means to periodically stop the advancement of said row, a fixed receptacle adapted to receive and support individual nuts, means for transferring the nuts of the said row successively from said stop means to said receptacle a cutting mechanism, and means for carrying the nuts successively from the receptacle and through the cutting mechanism.

6. In a machine of the character described, the combination of an inclined hopper, a trough located below said hopper and adapted to receive nuts therefrom and feed them onward in a row, means adjacent to the discharging end of said trough for periodically engaging the row of nuts and stopping the onward feed thereof, a fixed receptacle adapted to receive and support individual nuts, means for transferring the nuts of said row successively from said stop means to said receptacle, a cutting mechanism, and means for carrying the nuts successively from the receptacle and through the cutting mechanism.

7. In a machine of the character described, the combination of a hopper, a series of inwardly-extending spring-controlled pivoted arms, vertically-disposed plates on the inner ends of said arms forming an expansible elongated tapering receptacle, means for successively transferring nuts from the hopper to the receptacle, a reciprocating plunger for successively acting upon the nuts contained within said receptacle and forcing them therethrough in opposition to the inward pressure of the walls of said receptacle, a cutting mechanism, and means for successively receiving and carrying the nuts from the receptacle and through the cutting mechanism.

8. In a machine of the character described, the combination of a wheel, a series of radial arms pivoted at their inner ends to said wheel and arranged in pairs, clamping-jaws on the outer ends of said arms adapted to receive and hold nuts, springs tending to force the arms of each pair toward each other, means for intermittently rotating said wheel, a cutting mechanism, means for introducing nuts to said jaws and means for carrying nuts from the jaws and through the cutting mechanism.

9. In a machine of the character described, the combination of a hopper provided with an opening in the bottom thereof, an inclined trough located below said opening and adapted to receive nuts from said hopper and advance them in close contact in a single row, means for agitating said trough, means to periodically stop the advancement of said row, a fixed receptacle adapted to receive and support individual nuts, means for transferring the nuts of the said row successively from said stop means to said receptacle, a cutting mechanism, and means for carrying the nuts successively from the receptacle and through the cutting mechanism.

10. In a machine of the character described, the combination of a hopper provided with an opening in the bottom thereof, an inclined trough located below said opening and adapted to receive nuts from the hopper, an inclined chute located below said trough, means for agitating said trough, means for agitating said chute, means for successively transferring nuts from the trough to the chute, a receptacle located below the lower end of said chute and adapted to receive and support nuts in vertical position, a cutting mechanism, and means for carrying the nuts in their vertical position from the receptacle and through the cutting mechanism.

11. In a machine of the character described, the combination of a hopper provided with an opening in the bottom thereof, a pair of pivoted arms, a link connecting said arms, an inclined trough connected to said link and located below said opening, said trough being adapted to receive nuts from the hopper and advance them in close contact in a single row, means to periodically stop the advancement of said row, a pivoted frame, an inclined chute fixed to said frame and located to receive nuts from said trough, a link connected to one of said arms and said frame, means for agitating one of said arms, a receptacle located to receive nuts from said chute, a cutting mechanism, and means for carrying nuts from the receptacle and through the cutting mechanism.

12. In a machine of the character described, the combination of a hopper provided with an opening in the bottom thereof, an inclined trough located below said opening and adapted to receive nuts from the hopper and advance them in close contact in a single row, means to periodically stop the advancement of said row, a series of inwardly-extending spring-controlled pivoted arms adapted to successively receive and support nuts from said row, means for successively forcing the nuts between and below said arms, a cutting mechanism and means for transferring the nuts from the arms and through the cutting mechanism.

13. In a machine of the character described, the combination of a hopper, a series of inwardly-extending spring-controlled pivoted arms adapted to successively receive and support nuts from the hopper, means for successively transferring nuts from the hopper to the arms, an inclined chute located below said arms, a series of inwardly-extending spring-controlled arms located below said chute, plates secured to the inner ends of said arms and forming a tapering receptacle with an opening in the bottom thereof, a reciprocating head, a plunger carried by said head and adapted to force nuts between and below the first-named arms, a second plunger carried by said head and adapted to force the nuts through the receptacle, a cutting mechanism, and means for successively receiving and carrying the nuts from the receptacle and through the cutting mechanism.

14. In a machine of the character described, the combination of a hopper, a series of inwardly-extending spring-controlled pivoted arms adapted to successively receive and support nuts from the hopper, means for successively transferring nuts from the hopper to the arms, an inclined chute located below said arms, a series of inwardly-extending spring-controlled pivoted arms, located below said chute, plates secured to the inner ends of said arms and forming a tapering receptacle with an opening in the bottom thereof, a wheel, spring-actuated clamping-jaws arranged in pairs on said wheel; means for intermittently rotating the wheel whereby, when the latter is at rest, one of the pairs of jaws will occupy a position below the receptacle, a reciprocating head, a plunger carried by said head and adapted to force the nuts between and below the first-named arms, a second plunger carried by said head and adapted to force the nuts through the receptacle and into the underlying jaws, a cutting mechanism, and means for carrying the nuts endwise from one of the pairs of jaws in advance of those located below the receptacle and through the cutting mechanism.

15. In a machine of the character described, the combination with mechanism for cutting a series of slits through the shells of nuts, and means for successively carrying nuts therethrough, of means for receiving and advancing the nuts from said mechanism, a cutter arranged parallel to and extending entirely across the path traversed by the nuts as they are advanced from said mechanism, and means for actuating said cutter whereby a portion of the shell is severed from each succeeding nut.

16. In a machine of the character described, the combination of mechanism for cutting a series of slits through the shells of nuts, means for successively carrying nuts through said mechanism, a transfer device for successively removing the nuts from said mechanism, a cutter arranged parallel to and extending entirely across the path traversed by the nuts as they are moved from said mechanism, means for actuating said cutter, and means for releasing the nut from said transfer device.

17. In a machine of the character described, the combination with mechanism for cutting a series of slits through the shells of nuts, and means for successively carrying nuts therethrough, of means for receiving and advancing the nuts from said mechanism, a pair of cutters arranged in the respective sides of the path traversed by the nuts as they are advanced from said mechanism, said cutters having their flat sides opposite to each other, and means for supporting and actuating the cutters whereby portions of the shell are severed from each succeeding nut.

18. In a machine of the character described, the combination with the mechanism for cutting a series of slits through the shells of nuts, and means for successively carrying the nuts therethrough, means for removing the nuts from said mechanism on a line at right angles to the slits cut thereby, cutters arranged parallel to and extending entirely across the path traversed by the nuts as they are moved from said mechanism, and means for actuating said cutters whereby portions of the shell are severed from each succeeding nut.

19. In a machine of the character described, the combination with the mechanism for cutting a series of slits through the shells of nuts, and means for successively carrying the nuts therethrough, of a bar supported and guided at right angles to the slits cut by said mechanism, clamping members carried by said bar and adapted to receive nuts from said mechanism, means for reciprocating said bar toward and from said mechanism, cutters arranged parallel to and extending entirely across the path traversed by the nuts, and means for actuating said cutters whereby portions of the shell are severed from each succeeding nut.

20. In a machine of the character described, the combination with the mechanism for cutting a series of slits through the shells of nuts, and means for successively carrying nuts therethrough, of a bar supported and guided at right angles to the slits cut by said mechanism, a pair of arms pivoted to said bar and provided with diverging beveled ends, clamping-jaws on said arms adapted to receive nuts from said mechanism, springs acting upon said arms, means for reciprocating said bar toward and from said mechanism whereby the beveled ends of said arms coact with the nut to open the clamping-jaws during the forward stroke of the bar, cutters arranged parallel to and extending entirely across the path traversed by the nuts, means for actuating said cutters whereby portions of shell are severed from each succeeding nut, and means for opening said jaws at the end of the rearward stroke of the bar.

21. In a machine of the character described, the combination with the mechanism for cutting a series of slits through the shells of nuts, and means for successively carrying nuts therethrough, of a bar supported and guided at right angles to the slits cut by said mechanism, a pair of arms pivoted to said bar and provided with diverging beveled ends, clamping-jaws on said arms adapted to receive nuts from said mechanism, springs acting upon said arms, means for reciprocating said bar toward and from said mechanism whereby the beveled ends of said arms coact with the nuts to open the clamping-jaws during the forward stroke of the bar, cutters arranged parallel to and extending entirely across the path traversed by the nut, means for actuating said cutters whereby portions of the shell are severed from each succeeding nut, expanded portions on said arms, springs adapted to exert pressure against said expanded portions during the passage of the nut between the cutters, and means for opening said jaws at the end of the rearward stroke of the bar.

22. In a machine of the character described, the combination with the mechanism for cutting a series of slits through the shells of nuts, and means for successively carrying nuts therethrough, of a bar supported and guided at right angles to the slits cut by said mechanism, a pair of arms pivoted to said bar and provided with diverging beveled ends, clamping-jaws on said arms adapted to receive nuts from said mechanism, springs acting upon said arms, means for reciprocating said bar toward and from said mechanism whereby the beveled ends of said arms coact with the nut to open the clamping-jaws during the forward stroke of the bar, cutters arranged parallel to and extending entirely across the path traversed by the nuts, means for actuating said cutters whereby portions of shell are severed from each succeeding nut, and a block supported in the path traversed by said arms and adapted to act upon the inner faces of the latter whereby the jaws are opened as the bar nears the end of its rearward stroke.

23. In a machine of the character described, the combination with the mechanism for cutting a series of slits through the shells of nuts, and means for successively carrying nuts therethrough, of a bar supported and guided at right angles to the slits cut by said mechanism, a pair of arms pivoted to said bar and provided with diverging beveled ends, clamping-jaws on said arms adapted to receive nuts from said mechanism, springs acting upon said arms, means for reciprocating said bar toward and from said mechanism whereby the beveled ends of said arms coact with the nuts to open the clamping-jaws during the forward stroke of the bar, cutters arranged parallel to and extending entirely across the path traversed by the nuts, means for actuating said cutters whereby a portion of the shell is severed from each succeeding nut, expanded portions on said arms, oppositely-disposed pins provided with antifriction-rollers adapted to bear against said expanded portions during the passage of the nut between the cutters, springs tending to force said pins toward said arms, and means for opening said jaws at the end of the rearward stroke of the bar.

24. In a machine of the character described, the combination with mechanism for cutting a series of slits through the shells of nuts, and means for successively carrying nuts therethrough, of means for receiving and advancing the nuts from said mechanism, an adjustable frame, a cutter carried by said frame, means for actuating said cutter, and means adapted to be operated by the onwardly-moving nut for adjusting the frame to bring the cutter within a predetermined distance from the outside line of the nut, whereby a predetermined portion of the shell is severed from the latter.

25. In a machine of the character described, the combination with mechanism for cutting a series of slits through the shells of nuts, and means for successively carrying nuts therethrough, of means for receiving and advancing the nuts from said mechanism, a sliding frame having a beveled portion arranged in one side of the path traversed by the nuts, a cutter carried by said frame and arranged inwardly of said beveled portion; means for actuating said cutter whereby, when the nut engages the beveled portion, the frame is moved outwardly to bring the cutter in position to cut a predetermined thickness from the shell of the nut.

26. In a machine of the character described, the combination with mechanism for cutting a series of slits through the shells of nuts and means for successively carrying nuts therethrough, of means for receiving and advancing the nuts from said mechanism, a pair of oppositely-disposed sliding frames having parallel straight portions and inclined diverging portions extending from the straight portions and arranged in the respective sides of the path traversed by the nuts, means tending to force said frames toward each other, cutters carried by said frames and arranged inwardly of the straight portions, and means for actuating said cutters, whereby the same thickness of shell is severed from each succeeding nut irrespective of the size of the latter.

27. In a machine of the character described, the combination with mechanism for cutting a series of slits through the shells of nuts, and means for successively carrying nuts therethrough, of means for receiving and advancing the nuts from said mechanism, an adjustable frame, a cutter carried by said frame, means for actuating said cutter, means adapted to be operated by the onwardly-moving nut for adjusting the frame to bring the cutter within a predetermined distance from the outside line of the nut, whereby a predetermined portion of the shell is severed from the latter, and means operated by the second-named means for moving said frames away from the nut immediately following the cutting operation.

28. In a machine of the character described, the combination with mechanism for cutting a series of slits through the shells of nuts, and means for successively carrying nuts therethrough, of means for receiving and advancing the nuts from said mechanism, a pair of oppositely-disposed sliding frames having parallel straight portions and inclined diverging portions extending from the straight portions and arranged in the respective sides of the path traversed by the nuts, means tending to force said frames toward each other, cutters carried by said frames and arranged inwardly of the straight portions, means for actuating said cutters whereby the same thickness of shell is severed from each succeeding nut irrespective of the size of the latter, and means operated by the second-named means for moving said cutters from the nut immediately following the cutting operation.

29. In a machine of the character described, the combination with mechanism for cutting a series of slits through the shells of nuts, and means for successively carrying nuts therethrough, of means for receiving and advancing the nuts from said mechanism, a pair of oppositely-disposed sliding frames, a pair of oppositely-disposed cutters carried by said frames and extending entirely across the path traversed by the nuts, means adapted to be operated by the onwardly-moving nut for adjusting each of the frames to bring the cutters within a predetermined distance from the outside line of the nut, whereby predetermined thicknesses of the shell are severed from the latter, and means operated by the second-named means for moving said frames away from the nut immediately following the cutting operation.

30. In a machine of the character described, the combination with the mechanism for cutting a series of slits through the shells of nuts, and means for successively carrying nuts therethrough, of means for carrying the nuts from said mechanism on a line at right angles to the slits cut by the latter, a pair of oppositely-disposed sliding frames, a pair of oppositely-disposed cutters carried by said frames and extending entirely across the path traversed by the nuts, means adapted to be operated by the onwardly-moving nut for adjusting each of the frames to bring the cutters within a predetermined distance from the outside line of the nut whereby predetermined thicknesses of the shell are severed from the latter, and means operated by the second-named means for moving said frames away from the nut immediately following the cutting operation.

31. In a machine of the character described, the combination with mechanism for cutting a series of slits through the shells of nuts, and means for successively carrying nuts therethrough, of means for receiving and advancing the nuts from said mechanism, a pair of oppositely-disposed sliding frames, a pair of oppositely-disposed cutters carried by said frames and extending entirely across the path traversed by the nuts, means adapted to be operated by the onwardly-moving nut for adjusting each of the frames to bring the cutters within a predetermined distance from the outside line of the nut whereby predetermined thicknesses of the shell are severed from the latter, an arm pivoted between said frames and provided with means adapted to engage and move the latter away from the nut, and means for operating said bar, the last-named means being operated by the second-named means immediately following the cutting operation.

32. In a machine of the character described, the combination with mechanism for cutting a series of slits through the shells of nuts, and means for successively carrying nuts therethrough, of means for receiving and advancing the nuts from said mechanism, a pair of oppositely-disposed sliding frames, a pair of oppositely-disposed cutters carried by said frames and extending entirely across the path traversed by the nuts, means adapted to be operated by the onwardly-moving nut for adjusting each of the frames to bring the cutters within a predetermined distance from the outside line of the nut, whereby predetermined thicknesses of the shell are severed from the latter, an arm pivoted between said frames and provided with projections adapted to engage and move the latter away from the nut, a second pivoted arm arranged in the path traversed by the second-named means and connected to the first-named arm whereby the second-named means engages the second-named arm immediately following the cutting operation and thereby move said frames away from the nut.

In testimony whereof I affix my signature in presence of two witnesses.

JOHN H. GRUNER.

Witnesses:
ANDREW V. GROUPE,
RALPH H. GAMBLE.